US012775709B2

(12) United States Patent
Loman et al.

(10) Patent No.: US 12,775,709 B2
(45) **Date of Patent: *Oct. 27, 2026**

(54) APPARATUS AND METHODS FOR AN APPLICATION PROGRAMMING INTERFACE TO DETECT AND LOCATE MALWARE IN MEMORY

(71) Applicant: Sophos Limited, Abingdon (GB)

(72) Inventors: Mark Willem Loman, Delden (NL); Lute Edwin Engels, Hengelo (NL); Ronny Henk Gert Tijink, Hengelo (NL); Alexander Vermaning, Enschede (NL)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,523

(22) Filed: Jan. 29, 2025

(65) Prior Publication Data

US 2025/0173439 A1 May 29, 2025

Related U.S. Application Data

(63) Continuation of application No. 18/089,474, filed on Dec. 27, 2022, now Pat. No. 12,242,608.

(51) Int. Cl.
*G06F 21/56* (2013.01)
*G06F 12/14* (2006.01)

(52) U.S. Cl.
CPC ............ *G06F 21/566* (2013.01); *G06F 12/14* (2013.01); *G06F 21/564* (2013.01)

(58) Field of Classification Search
CPC ........ G06F 21/56; G06F 21/566; G06F 12/14; G06F 21/564
See application file for complete search history.

(56) References Cited

U.S. PATENT DOCUMENTS 8,935,789 B2 * 1/2015 Shukla .................. G06F 21/567 713/164
8,959,639 B2 * 2/2015 Shevchenko ........... G06F 21/56 726/25

(Continued)

FOREIGN PATENT DOCUMENTS

CN 107256358 A * 10/2017 ........... G06F 21/563

OTHER PUBLICATIONS

[Author Unknown] "Cobalt Strike's Process Injection: The Details" cobaltstrike by HelpSystems [Online] https://web.archive.org/web/20220516182638/https://www.cobaltstrike.com/blog/cobalt-strikes-process-injection-the-details-cobalt-strike/ (May 16, 2022); 5 pages.

(Continued)

*Primary Examiner* — Jayesh M Jhaveri
(74) *Attorney, Agent, or Firm* — COOLEY LLP

(57) ABSTRACT

Embodiments disclosed herein include an apparatus with a processor configured to receive an indication of a function call to an identified shared library and configured to perform an identified function. The processor is configured to insert a function hook in the shared library. The function hook is configured to pause the execution of the shared library when called. In response to the function hook, the processor is configured to identify a source location in one or more memories associated with an origin of the function call to the shared library. The processor is configured to scan a range of memory addresses associated with the source location in the one or more memories, and identify, based on the scanning, a potentially malicious process within the range of memory addresses.

20 Claims, 7 Drawing Sheets

(56) References Cited

U.S. PATENT DOCUMENTS

| | | | | |
|---|---|---|---|---|
| 9,098,704 | B2 * | 8/2015 | Ledenev | G06F 21/566 |
| 12,242,608 | B2 | 3/2025 | Loman et al. | |
| 2012/0331489 | A1 | 12/2012 | Branton | |
| 2015/0101052 | A1 * | 4/2015 | Ledenev | G06F 21/566<br>726/24 |
| 2015/0128266 | A1 * | 5/2015 | Tosa | G06F 21/566<br>726/23 |
| 2024/0211597 | A1 | 6/2024 | Loman et al. | |

OTHER PUBLICATIONS

Laflamme, O., "Cobalt Strike Process Injection", Boschko Security Blog [Online] https://web.archive.org/web/20220905170221/https://boschko.ca/cobalt-strike-process-injection/ (Nov. 2, 2021, Sep. 5, 2022); 17 pages.

Notice of Allowance for U.S. Appl. No. 18/089,474, by Loman, Mark Willem, mailed Oct. 30, 2024, 13 pages.

Office Action and Search Report for United Kingdom Application No. GB2319628, by Sophos Limited, mailed Jun. 11, 2024, 4 pages.

* cited by examiner

FIG. 7
790
Attack Intercepted
791
'beacon_stageless_APC_x64.exe' has been terminated to prevent execution of malicious code.
Please check your computer for malware and software updates.
792
773
793
794

APPARATUS AND METHODS FOR AN APPLICATION PROGRAMMING INTERFACE TO DETECT AND LOCATE MALWARE IN MEMORY

CROSS REFERENCE TO RELATED APPLICATIONS

This application is a continuation of U.S. patent application Ser. No. 18/089,474, filed Dec. 27, 2022, now U.S. Pat. No. 12,242,608, and titled "Apparatus and Methods for an Application Programming Interface to Detect and Locate Malware in Memory", which is hereby incorporated herein by reference in its entirety.

BACKGROUND

The embodiments described herein relate to methods and apparatus for detecting and/or locating malware in a memory, where the malware may be otherwise obfuscated and/or hidden.

Some known malicious artifacts can be embedded and distributed in several forms (e.g., text files, audio files, video files, data files, executable files, uniform resource locators (URLs) providing the address of a resource on the Internet, etc.) that are seemingly harmless in appearance but difficult to detect. Such known malicious artifacts can be prone to cause severe damage to or compromise of sensitive hardware, data, information, and/or the like. In some instances, the malicious artifacts may be designed to lay dormant and obfuscated for unknown periods of time, avoiding conventional methods of detection. Some know malicious artifacts can act unpredictably to cause damaging effects on sensitive hardware, data, information, and/or the like.

Thus, a need exists for reliable methods and apparatus to identify, detect, and/or locate such difficult to detect malicious artifacts so that suitable preventative and/or remedial measures may be taken to protect hardware, data, information and/or the like.

SUMMARY

According to an embodiment, an apparatus includes one or more memories and one or more processors. The one or more processors are operatively coupled to the one or more memories. The one or more processors are configured to identify a function call to a shared library. In response to the function call, the one or more processors are configured to insert a function hook into the shared library while loading the shared library into the memory. The function hook is configured to cause the one or more processors to pause execution of the shared library while executing a predetermined function. The one or more processors are configured to execute the predetermined function and, based on the execution of the predetermined function, scan a range of memory addresses located in the one or more memories. The range of memory addresses is determined based on the function call to the shared library. Based on the scan of the range of memory addresses, the one or more processors are configured to determine a presence or absence of a potentially malicious process stored in the memory. The one or more processors are further configured to locate a potentially malicious process stored in the one or more memories at a location within the range of memory addresses, during the pause of the execution of the shared library. The one or more processors are further configured to positively identify the potentially malicious process as a malware beacon.

In some embodiments, a non-transitory processor-readable medium stores code representing instructions to be executed by one or more processors. The instructions include code to cause the one or more processors to identify a function call being sent to a shared library. The function call is associated with a network communication. The instructions include code to cause the one or more processors to manipulate the shared library to insert a function hook into the shared library while loading the shared library into the memory. The function hook is configured to enable the one or more processors to pause execution of the shared library while executing a predetermined function. The instructions further include code to cause the one or more processors to execute the predetermined function, during the pause of the execution of the shared library, to identify a source location in one or more memories associated with an origin of the function call. The instructions further include code to cause the one or more processors to identify a range of memory addresses in the memory. The range of memory addresses is designed to include the source location in the memory associated with the origin of the function call. The instructions further include code to cause the one or more processors to scan the range of memory addresses in the memory and determine a presence or absence of a potentially malicious process stored in the memory. The instructions further include code to cause the one or more processors to block the communication based on a determination of a presence of a potentially malicious process stored in the memory.

In some embodiments, a method includes receiving an indication of a function call to an identified shared library. The function call can be configured to initiate a network connection. The method includes inserting a function hook in the shared library. The function hook is configured to pause the execution of the shared library and cause a jump to a predetermined function. The method includes executing the predetermined function to identify a source location in one or more memories. The source location can be associated with an origin of the function call to the shared library. The method further includes scanning a range of memory addresses associated with the source location in the memory. The method further includes identifying, based on the scanning, a potentially malicious process within the range of memory addresses.

DETAILED DESCRIPTION

Figure 1:
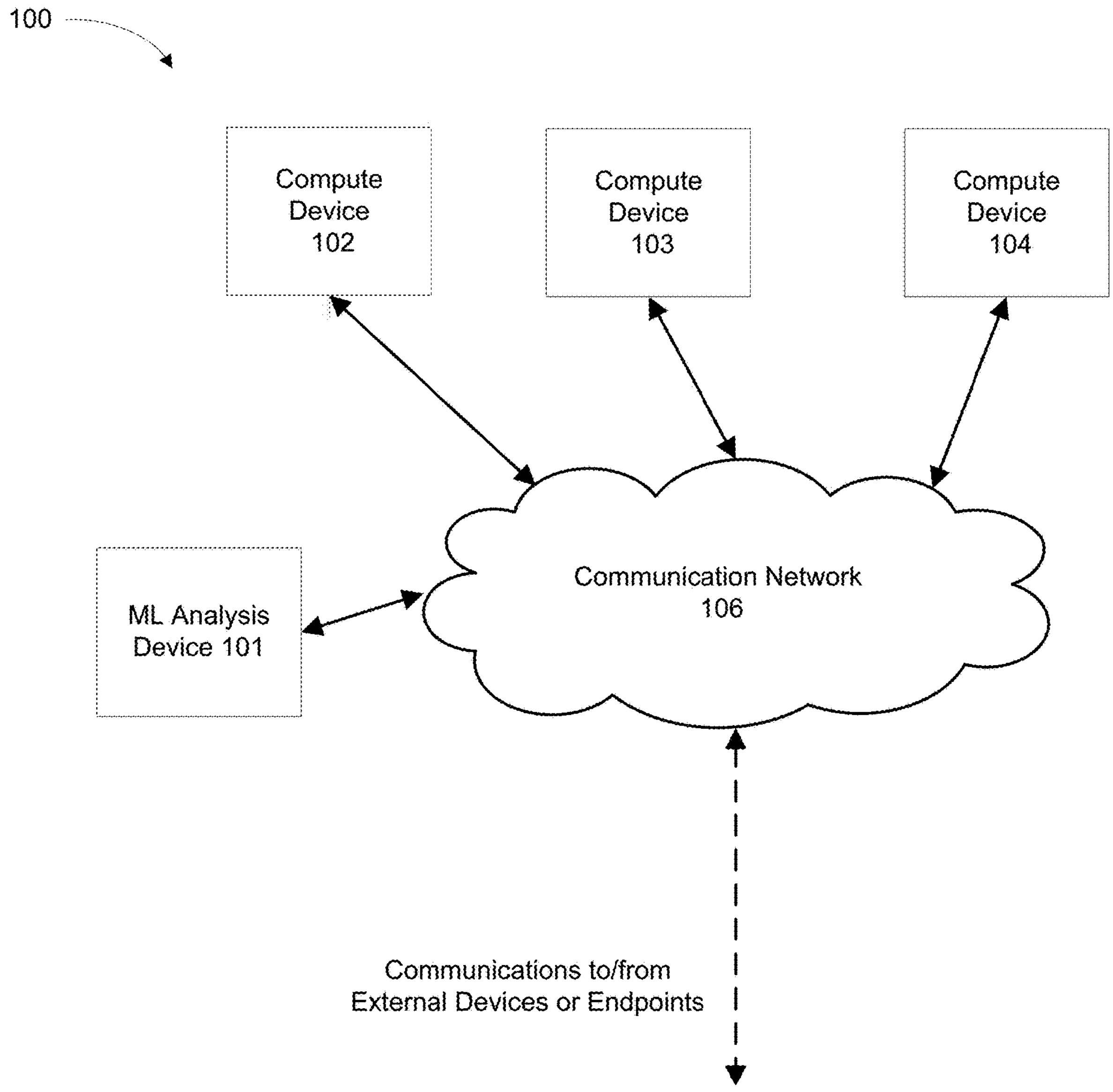
FIG. 1 is a schematic block diagram of a malware detection (MD) system for locating malware, according to an embodiment.

In some embodiments, an apparatus includes one or more memories and one or more processors operatively coupled to the one or more memories. The one or more processors are configured to identify a function call to a shared library and, in response to the function call, insert a function hook into the shared library while loading the shared library into the memory. The function hook is configured to cause the one or more processors to pause execution of the shared library while executing a predetermined function. The one or more processors are configured to execute the predetermined function and, based on the execution of the predetermined function, scan a range of memory addresses located in the one or more memories. The range of memory addresses is determined based on the function call to the shared library. The one or more processors are further configured to determine, based on the scan of the range of memory addresses, a presence or absence of a potentially malicious process stored in the one or more memories. During the pause of the execution of the shared library the one or more processors are configured to locate a potentially malicious process stored in the one or more memories at a location within the range of memory addresses. The one or more processors are further configured to positively identify the potentially malicious process as a malware beacon.

In some embodiments, a non-transitory processor-readable medium stores code representing instructions to be executed by one or more processors. The instructions include code to cause the one or more processors to identify a function call being sent to a shared library. In some instances, the function call is associated with a network communication. The instructions include code to cause the one or more processors to manipulate the shared library to insert a function hook into the shared library while loading the shared library into a first memory from one or more memories operatively coupled to the one or more processors. The function hook is configured to enable the one or more processors to pause execution of the shared library while executing a predetermined function. The instructions further include code to cause, during the pause of the execution of the API, the one or more processors to execute the predetermined function to identify a source location in the one or more memories. The one or more memories are associated with an origin of the function call. The instructions further include code to cause the one or more processors to identify a range of memory addresses associated with the one or more memories. The range of memory addresses is designed to include the source location in the one or more memories associated with the origin of the function call. The instructions include code to cause the one or more processors to scan the range of memory addresses and determine a presence or absence of a potentially malicious process stored in the one or more memories. The instructions further include code to cause the one or more processors to block the network communication based on a determination of a presence of a potentially malicious process stored in the one or more memories.

In some embodiments, a method includes receiving an indication of a function call to an identified shared library. The function call is configured to initialize a network connection. The method includes inserting a function hook in the shared library. The function hook is configured to cause a pause in the execution of the shared library and a jump to a predetermined function. The method includes executing the predetermined function to identify a source location in one or more memories. The source location is associated with an origin of the function call to the shared library. The method includes scanning a range of memory addresses associated with the source location in the one or more memories and identifying, based on the scanning, a potentially malicious process within the range of memory addresses.

Malicious software or malicious processes, otherwise referred to as malware, can be intrusive software designed to damage, destroy, or cause harm to computers, computer systems, users, or other entities or devices. Malware can be implemented, distributed, and/or stored via artifacts including computer files ("computer file(s)" or "file(s)") such as text or document files (collectively, "document file(s)") of various filetypes. Such files can be distributed or communicated via network (e.g., Internet) communications. For example, document files can include embedded, executable scripts or macros that, in some cases, can be configured to cause malicious activity on a host device (e.g., a computer) or in a host environment (e.g., of a computer, virtual machine, etc.). Malware can also be associated with a variety of other artifacts including uniform resource locators (URLs), Internet Protocol (IP) addresses, computer processes, registry entries, and/or the like, which may be used, generated, or modified to mediate malware distribution and/or execution. Examples of common malware include viruses, worms, Trojan horse viruses, spyware, adware, and ransomware.

Communications, artifacts, compute devices, servers, and/or hosts can be considered compromised due to being associated with identifiable malware and can be identified themselves as potentially malicious. Management systems, for example, cybersecurity management systems, can be configured to monitor, evaluate, manage, and/or maintain activity or security associated with communications, artifacts, compute devices, data storage devices, servers, and/or hosts of interest. Once malware is identified, remedial measures can be implemented to protect systems, devices, information, and/or data.

Malware that initiate malicious processes typically include one or more indicia that reveal patterns of the malware's behavior, and render the malware identifiable as a malware and/or recognizable as a type of malware. In some instances, however, some malware configured to initiate a malicious process can be difficult to detect because such malware can be configured to infect a compute device, server, and/or host, and lie in an obfuscated dormant state or inactive state, stored in a memory associated with the infected compute device, server, and/or host. While obfuscated, the malware can evade detection or identification by conventional security management systems that may manage the infected compute device, server, and/or host.

In some instances, malware can be configured to be distributed and stored at a destination (e.g., a memory associated with a compute device) in an obfuscated dormant state for a time period before being automatically activated to initiate the malicious process to perform one or more actions that may compromise, for example, hardware, software, data, information, and/or the like, thereby, for example, causing harm to compute devices, systems, users, or other entities. For example, in some instances, malware can be transformed to an obfuscated state by generating textual and/or binary data that can be difficult to interpret. In some instances, malware can include text strings that hide strings in a program, which may reveal patterns of the malware's behavior. (e.g., strings indicating access to registry keys, indicating access to infected URLs, and/or the like). In some instances, malware can include text strings that hide signature strings (also referred to as signatures), which are portions of malware governing a malicious process initiated by the malware that are not changed often, reveal patterns of the malware's behavior, and/or may be recognizable as the malware/type of malware if not for the obfuscated state. In some instances, malware can be obfuscated by being stored in a compressed form when in the dormant state to hide one or more text strings that reveal critical strings in a program and/or recognizable signatures included in the malware.

In some instances, malware that is in a dormant state and stored in an obfuscated state in a memory associated with a compute device can be configured to be automatically transformed into an active state to initiate a malicious process to perform one or more predefined actions. Malware can initiate a malicious process that includes a function call to any suitable function or shared library to perform one or more actions. In some instances, the shared library can be, for example, an application programming interface (API) or a dynamic link library (DLL). In some instances, the function call can be associated with initiating a network communication. In some instances, the function call can be an internal call associated with any suitable action within the compute device For example, malware can initiate a malicious process that is a beacon that upon activation is configured to initiate a communication with an external entity such as, for example, a command-and-control center (C2 center) via a command-and-control channel (e.g., C2 channel). Once in the active state in the compute device, the malicious process can include a scan of the compute device to initiate a command-and-control (C2) communication channel with a compute device associated with the malware's origin (e.g., the malicious entity orchestrating an attack to compromise the vulnerable host). Some examples of beacon include Cobalt Strike Beacon, Metasploit, and Sliver. In some instances, the malware can initiate a malicious process to perform other suitable actions (e.g., loading a shared library to access secure data, initiating a network connection, loading a library from kernel, etc.) that may lead to events compromising the host device, hardware, data, information, and/or the like.

The malware, when in the active state and during execution of a portion of the malicious process initiated by the malware, can assume an unobfuscated and exposed state such that a scan of the portion of the memory where the malware is located, during the execution of the portion of the malicious process initiated by the malware, can identify the malware as a malicious artifact. Said in another way, the malware, when captured or paused mid-execution, can be particularly vulnerable to being identified by a security scan of the portion of the memory where the code associated with the malware is located (e.g., a range of memory addresses encompassing the location where the malware resides in the memory). Embodiments disclosed herein include systems and methods configured to detect and/or locate malware that is otherwise difficult to locate by capturing a potentially malicious process initiated by the malware during the process's execution.

Embodiments disclosed include systems and methods to implement security management systems that include a malware detection (MD) system implemented at an MD analysis device and/or is in communication with compute devices, servers, data sources, data storage devices, hosts managed by the MD system and/or the like. The MD system can be configured to perform one or more of the actions described herein, either centrally via an MD analysis device and/or locally at a compute device included in the ML system, to detect and/or locate malware that is obfuscated, hidden, or challenging to find in a memory associated with that compute device. In some implementations, a malware detection system (MD system) can be configured to implement an MD interface via the MD analysis device and/or via a compute device included in the MD system.

The MD system, via the MD analysis device and/or locally via the compute device included in the MD system, can be configured to monitor the compute device (and/or other sources) for an indication of instructions to perform an identified action (e.g., an indication of an identified function call). An identified function call monitored for by the MD system can be predefined to be an indication of call from a potential malicious process or malware. The identified function call can be any suitable function call that a malicious process may be expected to generate with a likelihood higher than a predetermined threshold value (e.g., a function call to initiate a network connection, a function call to load a shared library, etc.). In some instances, the shared library can be an API. In some instances, the identified function call may be one that is typically made also by a non-malicious process, however, the identified function call may be associated with uncommon patterns of activity when made from malware (e.g., uncommon patterns of function calls).

In some implementations, the MD system is configured to monitor, at a first time, also referred to as a load time, for a first program, for example, a shared library, associated with the identified function call to be loaded in a first memory associated with the MD system (e.g., loaded onto a Random Access Memory (RAM) associated with a compute device included in the MD system). In some instances, the loading of the first program that is a shared library may be based on the first program being called by a potentially malicious process. In some instances, the loading of the first program that is a shared library may be based on a separate program or process routine to the operations of the compute device (e.g., a program routinely initiated upon startup, or some other routine function of an operating system, etc.) being called. The MD system is configured to inspect the first program associated with the identified function call when loaded. The MD system is configured to manipulate the first program to invoke execution of custom instructions during an execution of the first program. The MD system can manipulate the first program upon being loaded in the first memory such that a function call for execution of the first program at a second time, also referred to as an execution time, invokes an execution of the custom instructions. The manipulation of the program can include insertion of a function hook in the first program that causes a processor executing the instructions in the first program to jump, mid-execution of the first program, to a second program including custom instructions. The function hook causing the jump effectively pauses the execution of the first program to execute custom instructions included in the second program.

The processor executing the first program can be any suitable process associated with the MD system, for example, a processor associated with a compute device (e.g., compute devices 102-104, 302) included in the MD system. Thus, an instance of the identified function call to execute the first program, at a second time or execution time, after the first time or load time, invokes the processor to jump from executing the instructions in the first program, mid-execution, to executing the custom instructions included in the second program. The first time or load time and second time or execution time can occur non-contiguously or contiguously in any suitable manner. In some implementations, the first time or the load time can occur at an initial period of starting a processor associated with a compute device included in the MD system, for example, at startup or restart of the compute device etc., when the first program is first loaded in the first memory for that startup session of the compute device. The second time or the execution time can then occur following an instance of the identified function call at a later time during that start up session. In some implementations, the first time or the load time can occur following an instance of the identified function call, and is closely followed by the second time or execution time, for example, when the first program is not already loaded in the first memory at the time of an instance of the identified function call, and is therefore first loaded in the first memory at the load time before proceeding to execution at the second time or execution time based on the an instance of the identified function call.

In some implementations, a processor associated with the MD system (e.g., a central processor associated with the MD analysis device or a local processor associated with a compute device included in the MD system) can analyze the information associated with the instance of the identified function call in a compute device (e.g., parameters associated with the function call) to determine a region in a memory associated with the compute device (e.g., memory 320 of compute device 302 in FIG. 3) to be scanned to locate potential malware. In some implementations, the MD system can remediate any suitable location, identification, and/or classification of the potential malware once located and/or identified, using any suitable technique. In some implementations, the MD system can also perform or suggest or initiate remedial measures to be taken in response to the detection and determination of the potential malware to protect devices, systems, data, and/or information in the MD system.

In some implementations, an MD system can perform one or more of the above-described functions via the MD analysis device and/or a compute device included in the implementing a malware detection (MD) interface that causes one or more processors associated with the MD system to monitor a set of endpoints (e.g., compute devices, hosts, server, etc.) to identify a function call that may be associated with a malicious process, and to locate and/or identify malware initiating the malicious process, as described herein. In some implementations, an MD interface can be an application programming interface (API) that mediates communication between a management program (e.g., a program implementing a cybersecurity management system) and a computational program (e.g., applications, processes, or software executed in compute devices for various functions including running an operating system, document processing, image processing, communication processing, and/or the like).

FIG. 1 is a schematic representation, as a block diagram, of a malware detection (MD) system 100, also referred to herein as "a system," for implementing a malware detection process, according to one embodiment. In some implementations, the malware detection process can intercept an identified action at a compute device and, using information associated with instructions for performing the identified action, initiate an informed and focused scan of a set of memory addresses of a memory at a compute device to locate and/or identify a potentially malicious artifact, process and/or malware that may be otherwise difficult to identify.

Figure 2:
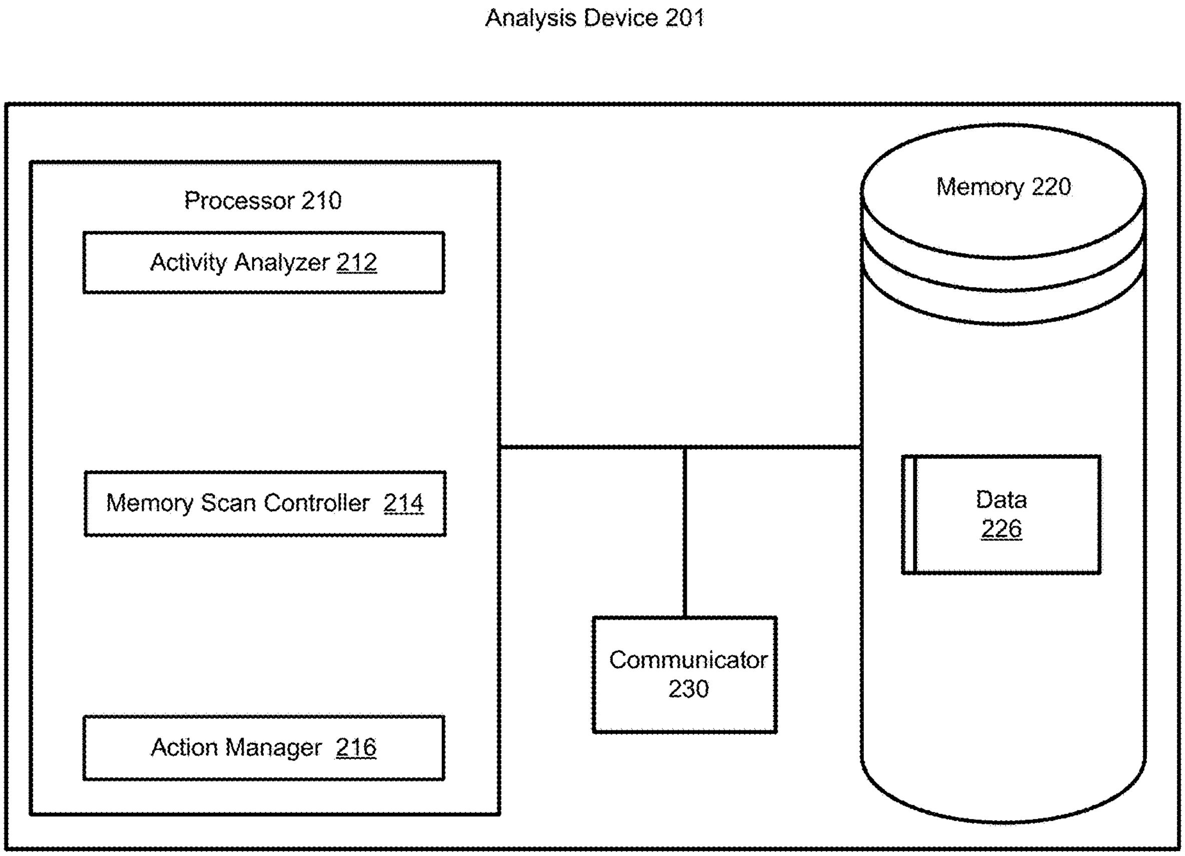
FIG. 2 is a schematic block diagram of a malware detection (MD) analysis device included in an MD system for locating malware, according to an embodiment.
Figure 3:
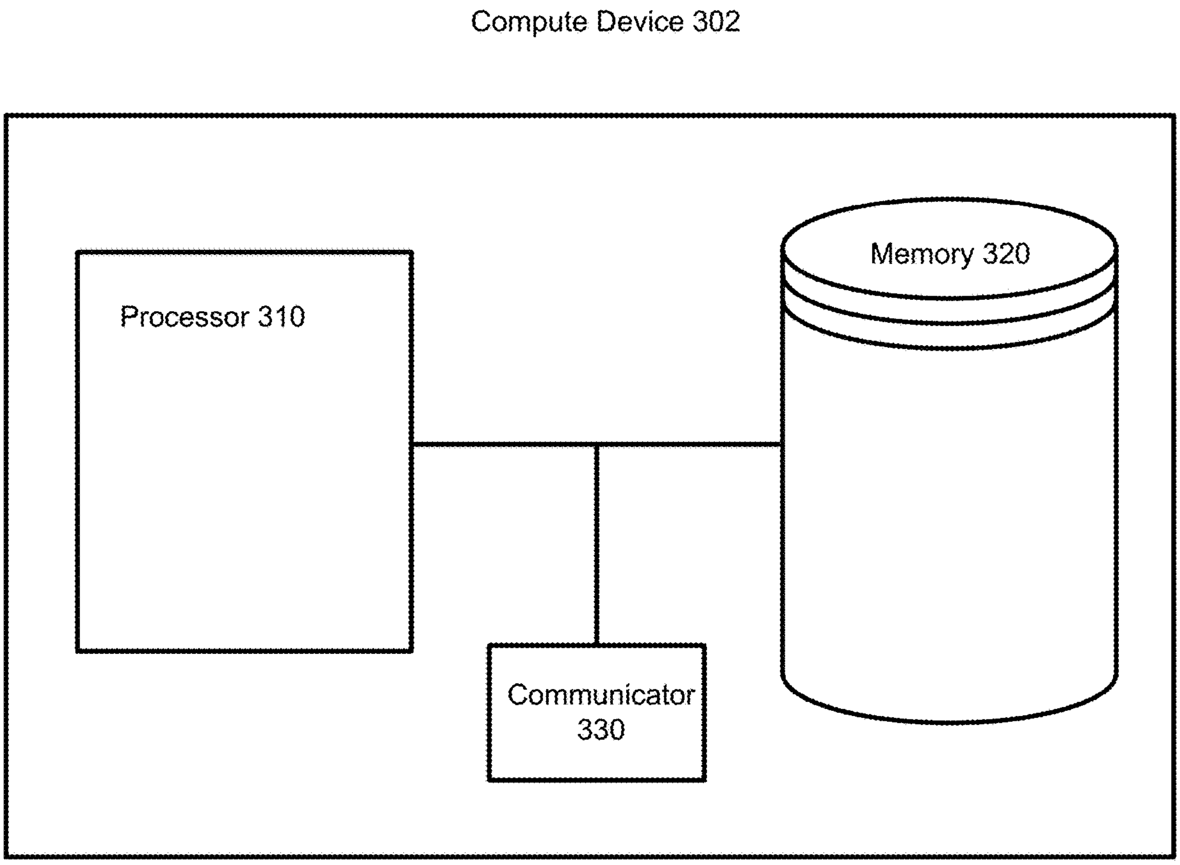
FIG. 3 is a schematic block diagram of a compute device included in an MD system for locating malware, according to an embodiment.

While FIGS. 1 and 2 describe processes or functions that occur and/or are performed via components associated with a malware detection (MD) analysis device in the MD system 100, to detect and/or locate a potential malware in a memory associated with the MD system 100, one or more or all of the same or similar processes or functions can occur and/or be performed locally at a compute device in the MD system via components associated with that compute device, as described with reference to FIG. 3.

The malware detection (MD) system 100 is configured to implement a method or process, via an MD analysis device 101, and/or via a compute device 102-104, to monitor digital activity associated with one or more endpoints (e.g., compute devices 102-104) in the MD system 100. For example, the MD analysis device 101 can identify a predetermined action and/or instructions to perform a predetermined action, for example, a predetermined function call. The MD system 100 can be configured to use the MD analysis device 101 to intercept the predetermined action mid-execution (e.g., by including a function hook in a shared library loaded into a memory of a compute device 102-104), and use information associated with the effectively paused execution of the predetermined action to locate a potentially malicious process, or malware to execute a potentially malicious process, that may be otherwise be challenging to locate (e.g., obfuscated) in a memory of a compute device 102-104 associated with the MD system 100. In some implementations, the MD system 100 may implement, via the MD analysis device 101 and/or locally via a compute device (e.g., compute devices 102-104), one or more steps including monitoring and/or identifying a first program (e.g., shared library) being loaded into a first memory (e.g., RAM), manipulating the first program, upon being loaded, to invoke execution of a second program including custom instructions, and based on an instance of the predetermined function call invoking execution of the first program and the second program with the custom instructions to initiate a focused scan to locate and/or identify a malicious process that is otherwise hard to locate in a memory associated with the MD system 100.

The MD system 100 includes a malware detection (MD) analysis device 101 (also referred to herein as "analysis device"), and compute devices 102-104, each connected to the other and to MD analysis device 101 via a communication network 106, as illustrated in FIG. 1. The compute devices 102-104, and/or the MD analysis device 101 can be in communication with one or more external devices via the communication network 106. While the system 100 is illustrated to include three compute devices 102-104, a similar analysis system can include any number of compute devices. In some embodiments, the system 100 can include one or more data sources (not shown) connected to the MD analysis device 101 and/or the compute devices 102-104, via the communication network 106.

The MD interface can be implemented via an MD analysis device 101 that is included in the MD system 100, and the MD interface can be a connection between the MD analysis device 101 and the compute device 102-104. In some implementations, the MD interface can be an application programming interface (API). The MD interface is configured to provide a connection between the MD analysis device 101 and a compute device (e.g., compute devices 102-104) to send/receive information associated with one or more processes including monitoring activity (e.g., loading of programs in a first memory), identifying the first program associated with an identified function call and when it is loaded in a first memory, inserting a function hook in the first program to cause a processor executing the first program (e.g., a processor of a compute device 102-104) to jump to a second program with custom instructions, receiving an instance of the identified function call and executing the first program, causing the jump to the second program and executing the second program orchestrating a focused memory scan, based on the execution of custom instructions, to determine a source location of a potential malicious process or malware while the first program is effectively paused mid-execution, identifying, classifying, or characterizing the potential malicious process or malware, and/or to determine or initiate one or more remedial measures based on the analysis, identification, classifying, or characterizing the potential malicious process or malware, and/or generating a report based on the detection and/or location of the malicious process.

The MD analysis device 101 of the system 100 can be configured to be in communication with the compute devices 102-104 to send and receive data via the communication network 106. The MD analysis device 100 can be included in a management system 100 associated with an entity or organization, for example, a cybersecurity or threat management system associated with an institution, configured to monitor, and manage a set of compute devices, servers, endpoints, and/or the like. The MD analysis device 101 can be configured to monitor activity in the compute devices 102-104 and/or receive indications of actions (e.g., function calls) that have been initiated in association with one or more of the compute devices 102-104. The MD analysis device 101 can be configured to manipulate, analyze, and/or evaluate the activity at the compute devices 102-104 and perform one or more managerial functions, for example, identify potential threats or artifacts associated with threats of malicious attack, trace and locate a source of a threat, determine a type of maliciousness associated with the potential threat, initiate remedial measures based on the determination (e.g., quarantine an application, artifact, memory, device, server, etc.), send an alert or a summary report regarding the determination, etc.

The compute devices 102-104 can include any suitable hardware-based computing devices and/or multimedia devices, such as, for example, a server, a desktop compute device, a smartphone, a tablet, a wearable device, a laptop and/or the like. The compute devices 102-104 can include a user device configured to connect to the MD analysis device 101 and/or an MD interface implemented by the MD analysis device 101. One or more of the compute devices 102-104 can interact with the MD analysis device 101 (via the MD interface) to receive and/or send signals/communications from and/or to the MD analysis device 101 to exchange data with the MD analysis device 101.

In some embodiments, the MD analysis device 101, also referred to herein as "the analysis device", or "the MD device", or simply "the device", can be used to implement processes or components configured to monitor computational activity associated with a set of endpoints, including compute devices 102-104. For example, the MD analysis device 101 can monitor indications of interactions of one or processes being executed at one or more compute devices with portions of the compute device, an operating system in that compute device, secure files (e.g., registry files) associated with the compute device, etc. The MD analysis device 101 can be configured to receive an indication of a first program that is associated with an identified function call to be loaded in a first memory at a first time also referred to as a load time. The MD analysis device 101 can be configured to manipulate one or more instructions in the first program upon being loaded in the first memory such that when the first program is invoked (for example by an instance of an identified function call associated with a potential malware) to be executed at a second time also referred to as an execution time, the processor executing the first program is caused to execute a second program including custom instructions. The MD analysis device 101 can be configured to analyze instructions associated with the action, for example instructions in the first program and the instance of the identified function call associated with the first program and can use the information to determine if the instructions are associated with a malicious artifact and/or a malicious process. The MD analysis device 101 can be configured to, via the custom instructions in the second program and while the first program is effectively paused during execution, obtain and/or use information associated with the instructions in the first program and/or the instance of the identified function call associated with the first program (e.g., parameters passed during the instance of the identified function call) to provide a range of memory addresses in a memory associated with a compute device (e.g., compute devices 102-104). The MD analysis device 101 can be configured to initiate a scan of the range of memory addresses to locate at the memory associated with a compute device a potentially malicious process or malware associated with a potentially malicious process that may be otherwise challenging to locate. In some implementations, the MD analysis device 101 can be configured to analyze the potentially malicious process or malware associated with a potentially malicious process to identify and/or characterize the malware and determine a course of action based on the determination. In some implementations, the MD analysis device 101 may be configured to initiate or perform one or more remedial measures based on the determination of a threat or threat level. As described herein, in some implementations, the MD analysis device 101 may be configured to implement a MD interface that is configured to provide a connection with the compute devices 102-104 to perform one or more of the above-described functions associated with the MD analysis device.

FIG. 2 is a schematic representation, of an MD analysis device 201, of an MD system similar to the MD system 100 shown in FIG. 1. The MD analysis device 201 can be substantially similar in structure and/or function to the MD analysis device 101 of FIG. 1. The MD analysis device 201 can be a hardware-based computing device, a multimedia device, or a cloud-based device such as, for example, a compute device, a server, a desktop compute device, a laptop, a smartphone, a tablet, a wearable device, a remote computing infrastructure, and/or the like. The MD analysis device 201 includes a processor 210, a memory 220 and a communicator 230. The MD analysis device 201 is depicted in FIG. 2 to have one processor, one memory, and one communicator for illustrative purposes only, and a similar MD analysis device can include any number of processors, memories, and/or communicators, in any suitable configuration.

The MD analysis device 201 can be configured to send and receive data to and from compute devices (e.g., compute devices 102-104 of system 100 in FIG. 1), data sources, and/or endpoints via the communicator 230 (e.g., operatively coupled to a communication network, such as communication network 106 of FIG. 1). In some instances, MD analysis device 201 can be configured to implement a management system or communicate with a compute device that implements the management system to manage a set of devices (e.g., manage the devices for cybersecurity). In some instances, the MD analysis device 201 can implement a malware detection process following methods disclosed herein. In some instances, the MD analysis device 201 can monitor activity in the compute devices and/or endpoints under its management, and be configured to identify a first program associated with an identified function call when it is loaded on to a first memory (e.g., of a compute device 102-104) at a first time (also referred to as the load time). The MD analysis device 201 can manipulate the first program upon being loaded on to the first memory to include custom instructions. The manipulation to include custom instructions can be by insertion of a function hook into the first program such that a processor executing instruction in the first program is caused to jump to a second program that includes the custom instructions. The manipulation by inserting a function hook can be such that when the first program is invoked by an instance of the identified function call to be executed via a processor associated with a compute device such as compute devices 102-104 at a second time (also referred to as an execution time) the processor (at a compute device 102-104) executing the first program is caused to jump to the second program while the execution of the first program is effectively paused, and carry out the execution of custom instructions in the second program. The custom instructions can direct the processor (e.g., at a compute device 102-104) to analyze information associated with the first program and/or the instance of the identified function call to the first program. Based on the analysis, the processor at the compute device can determine a source location of a program that may be the origin of the instructions transmitted to perform the identified action. In some instances, the processor associated with the compute devices (e.g., compute devices 102-104) can send data to the processor 210 associated with an MD analysis device 201 to perform one or more analyses to determine a source location of a program that may be the origin of the instructions transmitted to perform the identified action.

The processor 210 can initiate a focused scan of the range of memory addresses (compared to a wide scan of memory that may be time consuming and resource heavy) of a memory on a compute device 102-104 executing the program to locate the program that may be the origin of the instructions transmitted to perform the identified action. In some implementations, the MD analysis device 201 can locate and then identify the program (executing on a compute device 102-104) that may be the origin of the instructions transmitted to perform the identified action to be a malware or a program associated with a malicious process or determine a type or class of malware associated with the located program. Based on the identification or determination of type or class of malware, the MD analysis device 201 can recommend and/or initiate remedial measures that may be suitable to best protect resources.

While the description with reference to MD analysis device 201 is described such that the processor manipulating the first program, receiving data from the compute device and performing one or more analyses to determine a source location of a program that may be the origin of the instructions transmitted, initiating a focused scan of the range of memory addresses, etc. is the processor 210 associated with the MD analysis device 201, in some implementations one or more or all of these functions or steps can be executed by a processor associated with the compute device that is being monitored or managed (e.g., compute devices 102-104), that is a local processor associated with that compute device, as described with reference to compute device 302 in FIG. 3 below.

The memory 220 of the analysis device 201 can be, for example, a random-access memory (RAM), a memory buffer, a hard drive, a read-only memory (ROM), an erasable programmable read-only memory (EPROM), and/or the like. The memory 220 can store, for example, one or more software modules and/or code that can include instructions to cause the processor 210 to perform one or more processes, functions, and/or the like (e.g., activity analyzer 212, memory scan controller 214, and action manager 214, shown in FIG. 2). In some implementations, the memory 220 can be a portable memory (e.g., a flash drive, a portable hard disk, and/or the like) that can be operatively coupled to the processor 210. In some instances, the memory can be remotely operatively coupled with the MD analysis device 201, for example, via the communicator 230. For example, a remote database server can be operatively coupled to the MD analysis device 201.

The memory 220 can store data 226. The data 226 can include data received from compute devices (e.g., compute devices 102-104 of system 100 in FIG. 1), data sources, external devices, and/or other endpoints, as is suitable. Similar to the description of the compute device 102 and the analysis device 101 of system 100, the data 226 can include data received by the MD analysis device 201 from a data source, such as a compute device. In some implementations, the data 226 can include, for example, information associated with digital activities conducted in compute devices or endpoints, lists of identified actions and/or instructions to perform identified actions associated with malware or malicious processes, typical trends or patterns of activity associated with compute devices, processes, and/or applications, permissions associated with a process or application, temporal patterns of activity to be expected given a known external operation or user activity, and/or the like. In some implementations, the data 226 can be data associated with known malware, for example signatures associated with known malware or code or instructions associated with malicious processes. The data 226 can include information associated with known paths or agents of attack by malware, abnormal patterns of action or activity that may be associated with malware, and/or the like.

The data 226 can include data received from compute devices (e.g., compute devices 102-104 of system 100 in FIG. 1). The data 226 can include information or messages received from one or more compute devices indicating a state of the compute device(s) or a state of data associated with the compute device(s). For example, a security state reported by a firewall installed in a compute device, and policies (e.g., security policies) associated with the compute device(s). The data 226 can include information or messages received from one or more compute devices indicating an action initiated at the compute device, or an instruction that has been transmitted to initiate an action at the compute device(s). For example, signals or information received from one or more compute devices indicating an operating system running in a compute device(s), a state of activity associated with the compute device(s) and duration in that state (including authorized or unauthorized access to various portions of the compute device), any potential violations of policies instituted by the management system over the compute device(s) that were blocked, any threats detected, indications of a level of threat if identified (e.g., high level, medium level, low level threats), any indication of potential malware located and/or identified by the compute device(s), indications of memory addresses where malware is located, any threats blocked by the compute device(s) or by the management system (e.g., web threats faced by the compute device), type of protection associated with each compute device, type of device or other device related information (e.g., is it an endpoint, server, mobile device, etc.), level of encryption associated with the compute device(s), security profile associated with the compute device(s), third-party software or applications used by the compute device(s), security level associated with communications from and to the compute device(s) (e.g., protection of web or email messages), any other suitable information about hosts associated with the compute device(s), and/or users of the compute device(s) their user profiles, activity profiles, privileges, etc. and/or the like.

The data 226 can include data associated with (e.g., data used by, or data generated by) one or more processes, components, or routines implemented by the processor 210 to identify, locate, analyze, and/or classify a potentially malicious artifact or malicious process. For example, the data 226 can include data used by or associated with the activity analyzer 212, the memory scan controller 214, and/or the action manager 216. For example, the data 226 can include custom instructions to be incorporated into a second program that a processor is to jump to upon encountering the function hook in the first program. The data 226 can include data generated by the activity analyzer 212 based on analysis of information associated with an indication of an activity (e.g., parameters passed to a function call) at a compute device (e.g., a function call at a compute device). In some implementations, where one or more functions of the MD analysis device described herein is carried out locally at a compute device, data 226 can include instructions and/or information sent to and/or received from the compute device to carry out those function at the compute device.

In some implementations, the MD analysis device 201 can implement processes of malware detection that include analysis and/or manipulation of a first program associated with an identified action or an identified function call to intercept an instance of the identified function call and during execution for the first program cause a jump to execute custom instructions in a second program, as described herein. For example, the MD analysis device 201 can generate custom instructions or scripts to perform certain specified actions that may be directed to analysis of a program associated with the action (e.g., a program that was called using a function call that was intercepted) and/or to identifying a source location of a process or malware initiating the identified action or activity. The second program can be a predetermined function. The function hook causes the processor 210 to execute the second program with the custom instructions to provide information as desired to evaluate the source of the instructions initiating the identified action or activity.

The data 226 can include data associated with results of analysis and indications of a potential range of memory addresses to be scanned based on the results of analysis. Data 226 can also include information associated with initiating and/or controlling a focused scan of one or more memories associated with the MD analysis device 201 and/or memories associated with a compute device in the MD system including the MD analysis device 201.

The data 226 can include data associated with the action manager 216, including messages or information to be sent to compute devices (servers, endpoints, etc.), actions recommend or performed by the MD analysis device 201, and/or other analyses, metrics or reports generated that may be visualized via the MD interface. In some instances, the action manager 216 can, for example, be configured to evaluate a potential malicious process artifact or threat and send recommendations and/or instructions to another component of the processor 210, for example, a process configured to direct security measures of resources. In some instances, the action manager 216 can be configured to send instructions and/or recommendations to external devices, for example, one or more compute devices, proxies, and/or servers (not shown in FIG. 2) to execute or carry out one or more actions based on the results of the action manager 216 (e.g., block communications, quarantine files or artifacts, retrain classifiers, discard data sources, etc.). In some instances, the action manager 216 can send instructions or recommendations to external devices using the communicator 230 and via a communication network (e.g., communication network 106 of system 100 in FIG. 1).

The communicator 230 can be a hardware device operatively coupled to the processor 210 and memory 220 and/or software stored in the memory 220 executed by the processor 210. The communicator 230 can be, for example, a network interface card (NIC), a Wi-Fi™ module, a Bluetooth® module and/or any other suitable wired and/or wireless communication device. The communicator 230 can include a switch, a router, a hub and/or any other network device. The communicator 230 can be configured to connect the analysis device 201 to a communication network (such as the communication network 106 shown in FIG. 1). In some instances, the communicator 230 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 230 can facilitate receiving and/or transmitting data, including data associated with activities monitored and/or intercepted at compute devices, indications of function calls, parameters of function calls, memory addresses to scan, identification of a potentially malicious process or artifact at a memory address and/or other information, communication, or instructions through a communication network (e.g., the communication network 106 in the system 100 of FIG. 1). In some instances, received data can be processed by the processor 210 and/or stored in the memory 220 as described in further detail herein. In some instances, as described previously, the communicator 230 can be configured to send data collected and/or analyzed by one or more components of the processor 210 (e.g., the activity analyzer 212, the memory scan controller 214, and/or the action manager 216) to an external device (e.g., a server, a proxy, a compute device, etc.) of an MD analysis system (not shown in FIG. 1) to which the MD analysis device 201 is connected. The communicator 230 can also be configured to send data collected, analyzed, and/or generated by the processor 210 and the results of an analysis conducted by the processor 210. For example, communicator 230 can be configured to send/receive data generated as the result of interacting with users including system commands from users and used to operate and/or manipulate a management system, data associated with actions recommended or executed by the processor 210, for example, via the action manager 216, and/or recommendations based on the evaluation of potentially malicious artifacts or processes located in a memory address associated with a compute device, proxy, server, etc. associated with an MD analysis system to which the MD analysis device 201 is connected.

The processor 210 can be, for example, a hardware based integrated circuit (IC), or any other suitable processing device configured to run and/or execute a set of instructions or code. For example, the processor 210 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 210 is operatively coupled to the memory 220. In some embodiments, for example, the processor 210 can be coupled to the memory 220 through a system bus (for example, address bus, data bus and/or control bus).

The processor 210 includes and/or is configured to execute an activity analyzer 212, a memory scan controller 213, and an action manager 216. In some implementations, the activity manager 212, the memory scan controller 213, and/or the action manager 216 can be software stored in memory 220 and executed by processor 210. For example, code to cause the processor 210 to execute the activity manager 212, the memory scan controller 213, and/or the action manager 216 can be stored in the memory 220. In some implementations, the components can be hardware-based and implemented as a hardware device, such as, for example, an ASIC, an FPGA, a CPLD, a PLA, a PLC and/or the like.

The activity analyzer 212 can be configured to monitor activities recorded in one or more compute devices(s) in the MD system associated with the MD analysis device 201. The activity analyzer 212 can identify a first time or a load time when a first program that is associated with an identified action (e.g., an identified function call) is loaded onto a first memory (e.g., a RAM associated with the monitored compute device). The activity analyzer 212 can be configured to manipulate or cause the manipulation (e.g., locally at the compute device by sending instructions and/or information to the compute device) of the first program to insert a function hook in the first program. The function hook can be configured to cause a processor (at the monitored compute device) executing the first program at a second time or execution time based on an instance of the identified function call to jump from execution of the first program to execution of a second program based on the function hook. The second time or execution time can be following any suitable time when an instance of the identified function call is received. For example, an instance of a function call to an identified shared library to initiate a network communication (e.g., internetConnectA, see FIG. 6). In some instances, the shared library can be an application programming interface (API) or a dynamic link library (DLL). In some implementations, the first time or load time can be at a startup time and second time or execution time can be at a later time when the instance of identified function call is sent from a potential malware. In some implementations, the first time or the load time can itself be following the instance of the identified function call from the potential malware (e.g., when the first program is yet to be loaded into the first memory for that start up session).

The second program can include custom instructions that the processor (at the monitored compute device and/or analysis device 201) can then execute while the execution of the first program is effectively paused. As described in further detail herein, the function hook can direct the processor at the compute device to jump, i.e., relocate its instruction pointer, to instructions in the second program. The second program can include any suitable instruction that can direct the processor at the compute device to extract information associated with the function call, perform analyses, generate data that can be sent to another processor (e.g., processor 210 of MD analysis device 201) for further analysis (e.g., more intensive analysis than can be carried out at the local processor at the compute device), and/or the like.

In some embodiments, the activity analyzer 212 can be configured to insert or cause the insertion, by a local processor at a compute device (e.g., compute device 102-104) of a function hook by inserting an instruction, such as a jump instruction, into a first location in a memory associated with the compute device, (e.g., memory 320 of compute device 302). The first location can be a first memory address associated with the first program or the identified shared library. The jump instruction can be configured to direct a local processor associated with a compute device (e.g., compute device 102-104) to, upon execution of this instruction, 'jump" (i.e., relocate its instruction pointer) to a second location in a memory associated with the processor 210, for example, the memory 220. The second location can be a second memory address that is different than the first memory address.

The activity analyzer 212 can insert or cause the insertion of a function hook to cause execution of the function hook that can in turn cause execution of the second program. The activity analyzer 212 can cause the processor 210 to execute the custom instructions and/or code, introduced or included via the second program, before and/or in lieu of all or a portion of the instructions of the first program.

The activity analyzer 212 can be configured to instruct insertion of a function hook such that a processor at a compute device (e.g., compute devices 102-104), following the execution of the custom instructions and/or code introduced via the second program, "jumps back" to any suitable memory location. For example, the processor at the compute device (e.g., compute devices 102-104) can jump to a third memory location associated with another set of custom instructions. The function hook and the custom instructions in the second program can be used to instruct the processor at the compute device (e.g., compute devices 102-104) to perform any number of jumps. Following the jumps, the function hook and the custom instructions can instruct the processor at the compute device (e.g., compute devices 102-104) to jump back to the first memory location associated with the first program to return to the continued execution of the first program. Said in a different way, the activity analyzer 212 can cause the insertion of one or more instructions into any suitable memory location at the compute device (e.g., compute devices 102-104) such that, upon completion of the custom instructions and/or code associated with the function hook, the processor at the compute device (e.g., compute devices 102-104) returns to a predetermined point associated with a memory at the compute device and coupled to the processor at the compute device (e.g., compute devices 102-104).

The activity analyzer 212 can, thus, cause a processor at a compute device to alter the functionality and/or execution of at least a portion of the first program mid-execution, to make the processor at the compute device to jump to a second program to execute any suitable set of instructions that may be used to provide information indicating a source location associated with the origin or the source program or process that initiated the identified action or transmitted the instructions to perform the identified action.

The first program, in this example, the identified shared library, can be located at a first memory address in a memory at the compute device (e.g., in memory 320 of compute device 302 in FIG. 3) and associated with a processor (e.g., processor 310 of compute device 302 in FIG. 3) at the compute device. The function hook inserted into the first program, the identified shared library (e.g., a wininet.dll) can cause the jump to the second program (e.g., hmpalert.dll) located at a second memory address in a memory at that compute device. The second program can be and/or include a predetermined function and/or custom instructions to analyze the memory at the compute device. The activity analyzer 212 can either receive data to analyze or to cause the local processor at the compute device to analyze, using the custom instructions, information associated with the instance of the identified function call, for example parameters passed to call the function associated with the first program.

For example, the second program (e.g., hmpalert.dll shown in the example in FIG. 6) can include instructions to perform desired analyses on the information associated with the function call. For example, the second program can analyze parameters passed to initiate the function call (e.g., parameters passed to initiate a function call to wininet.dll). The second program can determine a memory address associated with a source location of the instructions to initiate an identified action, for example, the function call to the identified function (e.g., wininet.dll in the example in FIG. 6). The activity analyzer 212 can be configured to pass the determination of memory address to the memory scan controller 214.

The memory scan controller 214 can receive input from the activity analyzer 212 and provide an upper bound and a lower bound of memory address of a memory at the compute device (e.g., memory 320 of compute device 302 in FIG. 3) that generate a range of memory addresses in that memory, where the range of memory addresses encompasses the source location identified by the activity analyzer 212. The memory scan controller 214 can initiate a focused memory scan of one or more memory addresses associated with the range of memory addresses. The memory scan controller 214 can conduct a focused scan of the range of memory addresses while the execution of the instructions to initiate the identified action remain paused. For example, the execution of the shared library that was called via the function call (e.g., wininet.dll in FIG. 6) to initiate the identified action (e.g., initiate a network connection using the function call internetConnectA, in the example illustrated in FIG. 6) remains paused.

In some instances, potential malware may be stored in an obfuscated state in the one or more memories of a compute deice that is being monitored, for example, when in a dormant state of inactivity. Malware or code for a malicious process can be very challenging to detect based on memory scans, as the malware may not take up much memory, making identification from scanning vast ranges of memory addresses very resource and energy intensive for limited if any return. When the malware is further obfuscated, the malware can evade conventional screening even more effectively. The malware is, however, configured to transform to an unobfuscated state or exposed state when activated from the dormant state and is more vulnerable to being located and identified during a memory scan. The range of addresses to scan can still be indeterminate and the transformation to an activated state that is unobfuscated may be very transient and hard to identify while actively scanning the memory addresses where the malware is located. A memory scan performed when instructions initiating the associated function call are paused mid-execution, however, provides a unique window of opportunity where the malware remains unobfuscated. This allows analysis of the function call and to predict a source location and/or memory address associated with the function call, and can provide a limited range of memory addresses to perform a focused scan of the memories associated with the function call. The focused scan can locate the potential malware at a location within the range of memory addresses provided during a time period that the execution of instructions to initiate the identified activity (e.g., initiate a communication channel by the function call internetConnectA to wininet.dll) is paused.

The memory scan controller 214 can receive information associated with the results of the focused scan of the provided limited or focused range of memory addresses. Based on the information, the memory scan controller 214 can identify malware or code associated with a malicious process in a memory at a compute device (e.g., identify code to be a malware beacon like Cobalt Strike beacon in the example in FIG. 6, signaling to make a communication channel with a control command center), determine a type or class of malware, and/or determine a risk associated with the malware.

The action manager 214 can be configured to receive results from the memory scan controller 214 and, based on the results, generate and/or implement an action to be performed. As an example, the MD analysis device 201 can be part of a cybersecurity system that manages a set of endpoints that may be in communication with a set of hosts. The action manger 216 can generate a report or summary of malware identified and potential compromise of resources that may be involved. The action manager 216 can send the report to an external device and/or a user for further consideration. The action manager 216 can also make recommendations of remedial measures to take (e.g., block further execution of the first program, quarantine the memory and/or the compute device associated with the memory where the malware was found, review user activity and/or communication history, and/or the like).

In use, the MD analysis device 201 monitors activities in a set of compute devices or endpoints in an MD analysis system. The MD analysis device 201 receives an indication of an identified action or a transmission of an instruction to perform an identified action. For example, a loading of a first program, at a first time or a load time, onto a first memory associated with a compute device. The MD analysis device 201 inspects the first program and manipulates the first program at a load time inserts, in the first program, a function hook to a second program including custom instructions. Insertion of a function hook can cause a jump, during execution, from a first memory location storing a first instruction to a second memory location storing a second instruction. A hooking or insertion of a function hook is a process that redirects the processing of a function, program, or module to an alternative location in memory of the compute device where a custom and/or second program or code resides. In some implementations, the custom program can be located in a portion of a memory that is known or associated with the MD system. Hooking can be used to bypass a function and/or execute in its place another function and/or otherwise obtain access to information, code, or other resources (e.g., parameters) that are associated with the hooked function.

The second program may include custom instructions to analyze information associated with the instance of the identified action (e.g., identified function call) or the transmitted instructions to perform the identified action (e.g., open network connection). The second program may be directed to identify a source location associated with the origin or the source program or process that initiated the identified action or transmitted the instructions to perform the identified action. In some implementations, the memory scan controller 214 can be a part of the custom instructions in the second program. In some implementations, the memory scan controller 214 can be invoked by the custom instructions in the second program, The second program is thus executed by the processor associated the compute device, while the first program is still effectively paused mid-execution, and performs the analysis and/or identification of location directed by the instructions in the second program. In some embodiments, the second program can instruct the processor at the compute device to send data to another processor, for example a processor 210 at the MD analysis device, to conduct analysis and provide results back to the processor at the compute device.

The MD analysis device 201 then causes a generation of a source location in a memory at the compute device that is predicted to contain the source program or process that is the origin that initiated the identified action or transmitted the instructions to perform the identified action. The MD analysis device 201 then causes the generation of a range of memory address associated with the source location. The range of memory address can be a focused set of memory address that encompass the source location. The MD analysis device 201 can then cause a scan or initiate a scan of the range of memory addresses to locate the source program or process that initiated the identified action or transmitted the instructions to perform the identified action.

The MD analysis device 201 then identifies or causes the identification of potential malware or a potentially malicious process residing at the source location within the range of memory addresses. The MD analysis device 201 can then generate an identification and/or a characterization of the potential malware or the potentially malicious process or generate a classification associated with the malicious process. Based on the identification or classification, the MD analysis device 201 can generate a report, or a recommendation for potential remedial measures that can be taken to protect resources associated with the MD analysis system. The MD analysis device 201 can also initiate or send instructions to the compute device to initiate remedial measures based on authorization from an authority associated with the MD analysis system. Remedial measures can include, for example, block further execution of the process calling the first program, quarantine the source location and/or artifacts found at the source location, block one or more communications associated with the function call to the first program, etc.

As described previously, one or more of the function described above with reference to the MD analysis device 201 and/or the processor 210 can be performed locally at a compute device for example by a local processor associated with the compute device. FIG. 3 describes such an example compute device included in an MD system as described herein.

FIG. 3 is a schematic representation, of a compute device 302, included in an MD system similar to the MD system 100 shown in FIG. 1. The compute device 302 can be substantially similar in structure and/or function to the compute devices 102-104 of FIG. 1. The compute device 302 can be a hardware-based computing device, a multimedia device, or a cloud-based device such as, for example, a compute device, a server, a desktop compute device, a laptop, a smartphone, a tablet, a wearable device, a remote computing infrastructure, and/or the like. The compute device 302 includes a processor 310, a memory 320 and a communicator 330. The compute device 302 is depicted in FIG. 3 to have one processor, one memory, and one communicator for illustrative purposes only, and a similar compute device can include any number of processors, memories, and/or communicators, in any suitable configuration.

The communicator 330 can be a hardware device operatively coupled to the processor 310 and memory 320 and/or software stored in the memory 320 executed by the processor 310. The communicator 330 can be, for example, a network interface card (NIC), a Wi-Fi™ module, a Bluetooth® module and/or any other suitable wired and/or wireless communication device. The communicator 330 can include a switch, a router, a hub and/or any other network device. The communicator 330 can be configured to connect the compute device 302 to a communication network (such as the communication network 106 shown in FIG. 1). In some instances, the communicator 330 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communicator 330 can facilitate receiving and/or transmitting data, from and to the MD analysis device in that MD system couple to the compute device 302.

The processor 310 can be, for example, a hardware based integrated circuit (IC), or any other suitable processing device configured to run and/or execute a set of instructions or code. For example, the processor 310 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 310 is operatively coupled to the memory 320. In some embodiments, for example, the processor 310 can be coupled to the memory 320 through a system bus (for example, address bus, data bus and/or control bus).

In some implementations, the processor 310 includes and/or is configured to execute one or more functions described with reference to the MD analysis device 201 and/or the processor 310 above with reference to FIG. 2. Code to cause the processor 310 to execute the various functions or instructions can be stored in the memory 320. In some implementations, the components can be hardware-based and implemented as a hardware device, such as, for example, an ASIC, an FPGA, a CPLD, a PLA, a PLC and/or the like.

In some implementations, the compute device 302 can perform one or more function described above with reference to the MD analysis device 201. For example, the compute device 302 can be configured to send and receive data to and from an MD analysis device (e.g., MD analysis devices 101 and 201 in FIGS. 1 and 2, respectively), via the communicator 330 (e.g., operatively coupled to a communication network, such as communication network 106 of FIG. 1). In some instances, compute device 302 can be configured to receive instructions to implement a malware detection process following methods disclosed herein. In some instances, the compute device 302 can locally monitor activity in the compute device 302 to identify a first program associated with an identified function call when the first program is loaded into a first memory at a first time (also referred to as the load time). The compute device 302 via the processor 310 can manipulate the first program locally upon being loaded on to the first memory to include custom instructions by inserting a function hook into the first program. The function hook can be such that a processor 310 executing instructions in the first program at the compute device 302 is caused to jump to a second program that includes the custom instructions. When the first program is invoked by an instance of the identified function call to be executed via the processor 310 at a second time (also referred to as an execution time) the processor 310 executing the first program is caused to jump to the second program while the execution of the first program is effectively paused. The processor 310 can then execute the custom instructions in the second program. The custom instructions can direct the processor 310 to analyze information associated with the first program and/or the instance of the identified function call to the first program, and based on the information. For example, the processor 310 can conduct a scan of the memory 320 around the location in the memory 320 from where execution of the first program was called. Based on the analysis, the processor 310 can determine a source location of a program in the memory 320 that may be the origin of the instructions transmitted to perform the identified action. The processor 310 can then determine whether the origin of the instructions requesting execution of the first program are malicious and, if so, take appropriate remedial action. If determined to not be malicious, the second program can cause the processor 310 to jump back to the first program to continue execution of the first program.

Figure 4:
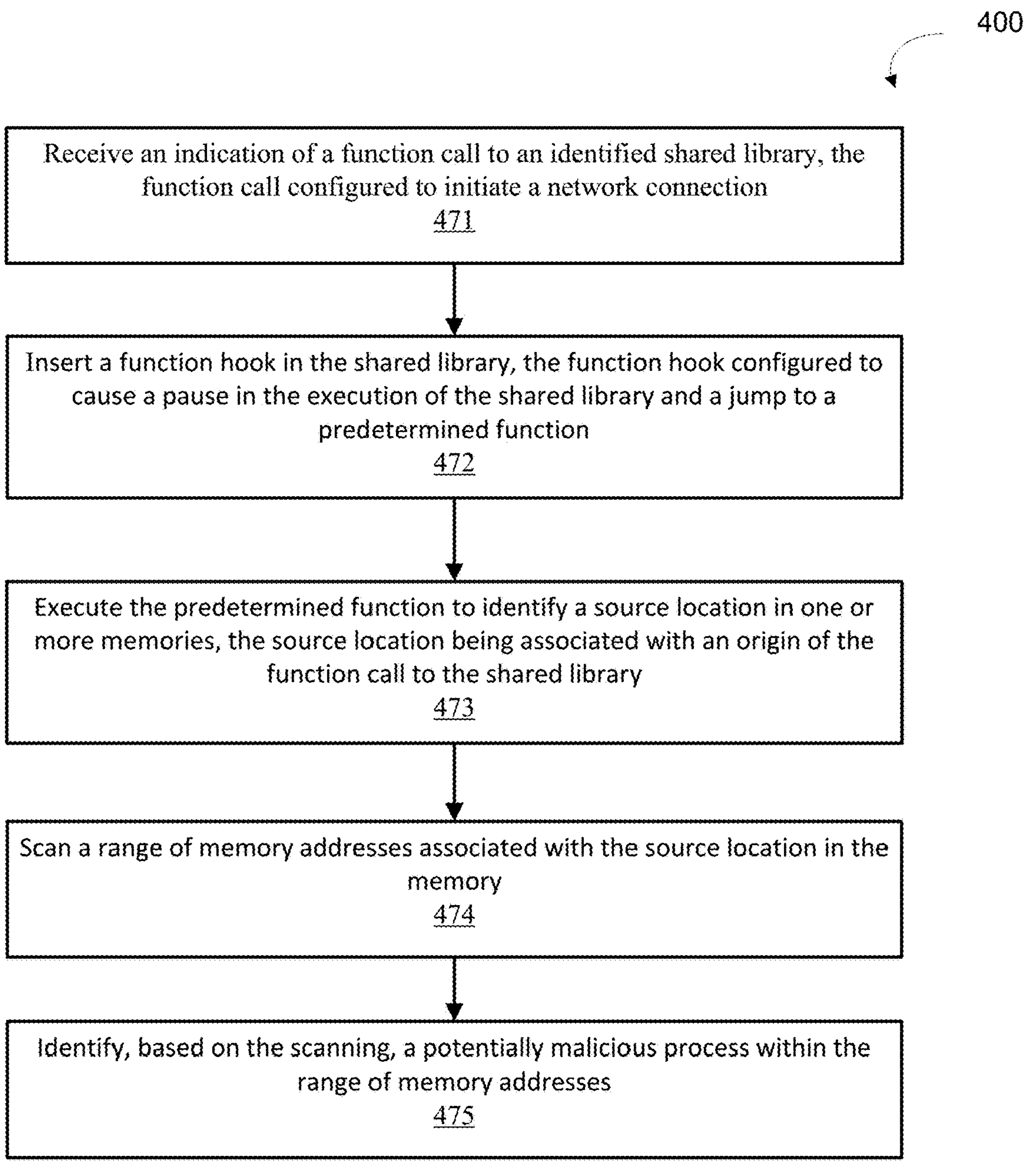
FIG. 4 is a flowchart showing a method of locating and identifying a potentially malicious process in a memory using an MD system, according to an embodiment.

FIG. 4 is a flowchart of a method 400 illustrating an example implementation using an MD system, according to an embodiment. The method 400 can be implemented by any MD system described herein, for example, system 100 described herein. Portions of the method 400 can be implemented using a processor of any suitable MD analysis device, for example analysis device 101 and/or 201 described herein. Portions of the method 400 can be implemented using a processor of any suitable compute device, for example compute devices 102-104, 302 described herein.

The method 400, at 471, includes receiving an indication of a function call to an identified shared library, the function call configured to initiate a network connection. Here the indication of a function call to an identified shared library can be an identified action, to initiate a network connection. The function call can be executed at a compute device (e.g., compute devices 102-104, 302 described in FIGS. 1 and 3) included in a MD system.

At 472, the method 400 includes inserting a function hook in the shared library. The function hook is configured to cause a pause in the execution of the shared library and a jump to a predetermined function. The predetermined function can include custom instructions to perform custom operations as described herein. The inserting a function hook can be during a first time also referred to as a load time when the shared library is first loaded into a first memory (e.g., RAM) associated with the compute device. The insertion of the function hook can be configured such that when an execution of the shared library is invoked at a second time (also referred to as an execution time) following the first time or load time, the processor associated with that compute device jumps from executing the shared library to executing the custom instructions in the predetermined function. The shared library can be invoked by an instance of the function call to the identified shared library at the second time or execution time. The custom instructions can direct a processor to analyze one or more parameters used to in the function call to the identified shared library to obtain information useful to locate an origin of the function call. The custom instructions can direct a processor to use the information to identify a source location associated with the origin of the function call.

At 473, the method 400 includes executing the predetermined function to identify a source location in one or more memories. The source location is associated with an origin of the function call to the shared library (e.g., called by an executing potentially malicious program or process). In some implementations, the method 400 can include providing a range of memory addresses such that the source location is included in the range of memory addresses.

At 474, the method 400 includes scanning a range of memory addresses associated with the source location in a memory associated with the compute device. The scanning can be using any suitable method or process including signature-based methods, template matching methods, and/or the like. The scanning can be performed or initiated by a processor associated with the compute device (e.g., processor 310 of compute device 302 in FIG. 3) and/or a processor associated with an MD analysis device (e.g., processor 310 of MD analysis device 201 in FIG. 2).

At 475, the method 400 includes identifying, based on the scanning, a potentially malicious process within the range of memory addresses. In some implementations, the method 400 can further include identifying, characterizing, and/or classifying the potentially malicious process using any suitable technique (e.g., signature analysis, comparing to a black list or template of malware, using a maliciousness classifier, using machine learning models to characterize or classify potentially malicious artifacts, etc.). In some implementations, the method 400 can include performing or recommending one or more remedial measure based on the identifying, characterizing, and/or classifying the potentially malicious process. One or more of the steps of identifying a potentially malicious process, characterizing, and/or classifying the potentially malicious and/or the like can be performed or initiated by a processor associated with the compute device (e.g., processor 310 of compute device 302 in FIG. 3) and/or a processor associated with an MD analysis device (e.g., processor 310 of MD analysis device 201 in FIG. 2).

Figure 5:
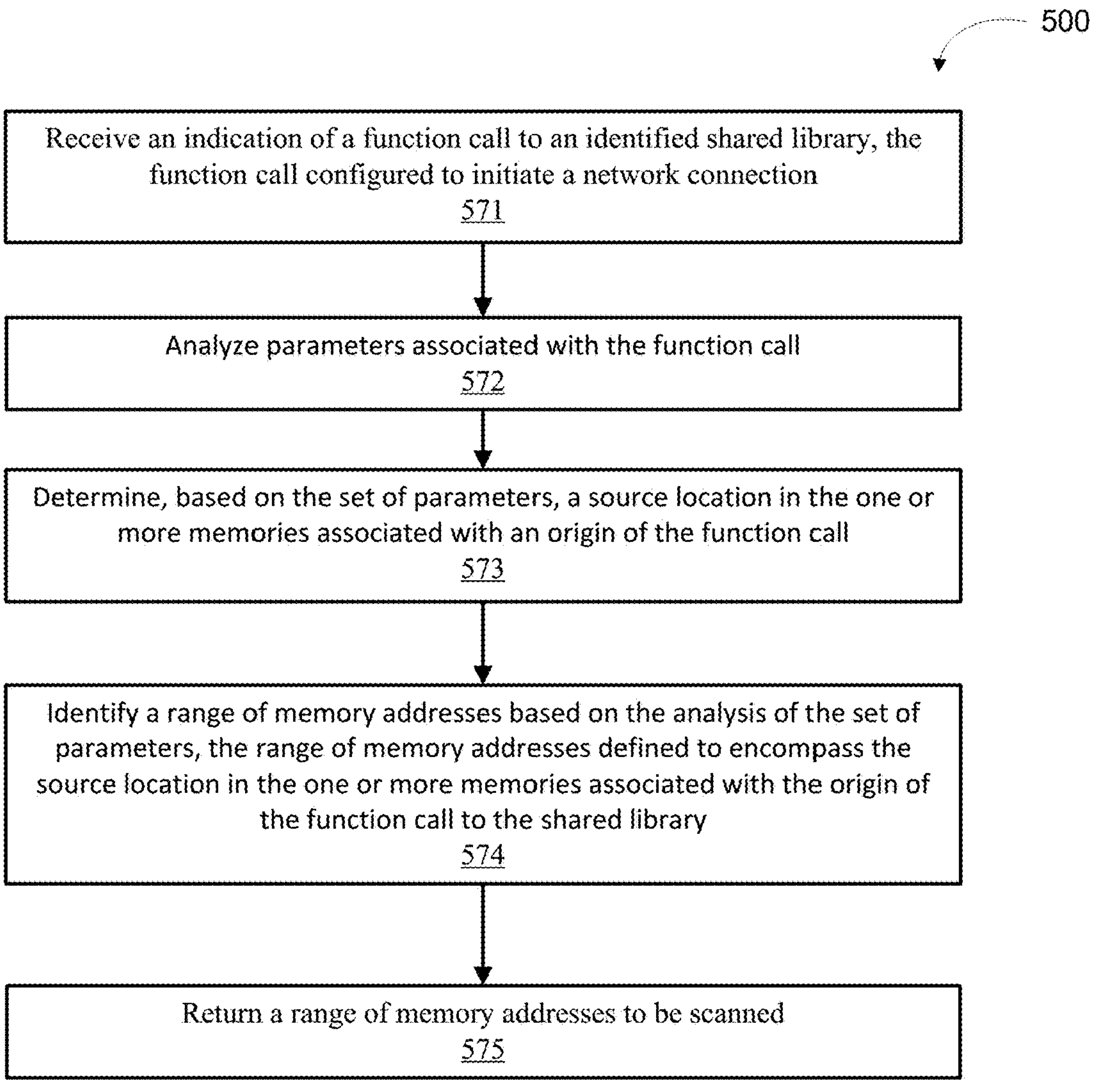
FIG. 5 is a flowchart showing a method of using an MD system to locate a potential malicious process in a memory, according to an embodiment.

FIG. 5 is a flowchart of a method 500 of implementing and using an MD interface using an MD analysis device, as described herein, according to an embodiment. The method 500 can be substantially similar in execution and/or function as method 400. In some implementations, the method 500 can be included in the method 400. The method 500 can be implemented by any MD system described herein, for example, system 100 described herein. The method 500 can be implemented using a processor of any suitable compute device included in an MD system, for example compute device 102-104, 302 described herein. One or more portions of the method 500 can be initiated based on instructions from any suitable MD analysis device, for example analysis device 101 and/or 201 described herein The method 500, at 571, includes receiving an indication of a function call to an identified shared library, the function call configured to initiate a network connection. The method can include intercepting the function call mid-execution at the compute device. The method can identify that the shared library is loaded into a first memory (e.g., RAM associated with the compute device) at a first time referred to as a load time. The method 500 can then include manipulating the shared library by inserting a function hook in the shared library at the first time or load time. The shared library is a first program located at a first memory location. The function hook can provide jump instructions to a second memory location. The method can insert the function hook to direct the processor to jump to a second memory location associated with a second program including custom instructions to perform one or more analyses associated with the intercepted function call (e.g., parameters passed with the function call).

The method 500 can include, at 572, analyzing parameters associated with the function call. The analysis can be performed at a second time also referred to as the execution time when the identified shared library or the first program that was manipulated was invoked to be executed. The identified shared library can be invoked, for example, when there is a function call to the identified shared library from a potentially malicious process. During execution of the identified shared library by a processor associated with the compute device, the processor encounters the function hook with the jump instructions, and following the jump instructions jumps to the second memory location associated with the second program that includes custom instructions for the analysis. The processor can the execute the custom instructions in the second program to perform the directed analysis.

At 573, the method includes determining, based on the set of parameters, a source location in the one or more memories associated with an origin of the function call. The one or more memories can be associated with the compute device. The analysis can include any suitable number of steps that may include extracting any suitable information that may help provide an indication of a source location associated with an origin of the function call. For example, the function call can be internetconnectA, which is a call to execute a first program, wininet.dll. In some implementations, the parameters may include a handle (e.g., hInternet) returned by a previous call to another identified function (e.g., InternetOpenA function), an indication of a transmission control protocol/internet protocol (TCP/IP) port to be used on a server (e.g., nServerPort), a pointer to a null-terminated string that specifies the name of the user to log on (e.g., lpszUserName), a type of service to access (e.g., dwService), and/or any other suitable parameters. In some implementations, a handle, for example, the handle (e.g., hInternet) returned by a previous call to another identified function (e.g., InternetOpenA function), can be used to extract further information that may be used to locate a source location. For example, a parameter and/or a handle returned by one or more programs may include information related to a name of application or entity calling the function (e.g., a parameter lpszAgent), an indication of a pointer to a memory address associated with the function call, and/or the like.

At 574, the method includes identifying a range of memory addresses based on the analysis of the set of parameters. The range of memory addresses can be defined to encompass the source location in the one or more memories associated with the origin of the function call to the shared library. The range of memory addresses can be set to include a set of memory address higher than the source location associated with an origin of the function call and a set of memory address lower than the source location.

At 575, the method 500 includes returning a range of memory addresses to be scanned. The scanning can be using any suitable method (e.g., search using a signature of a known malware, etc.) as described herein.

Figure 6:
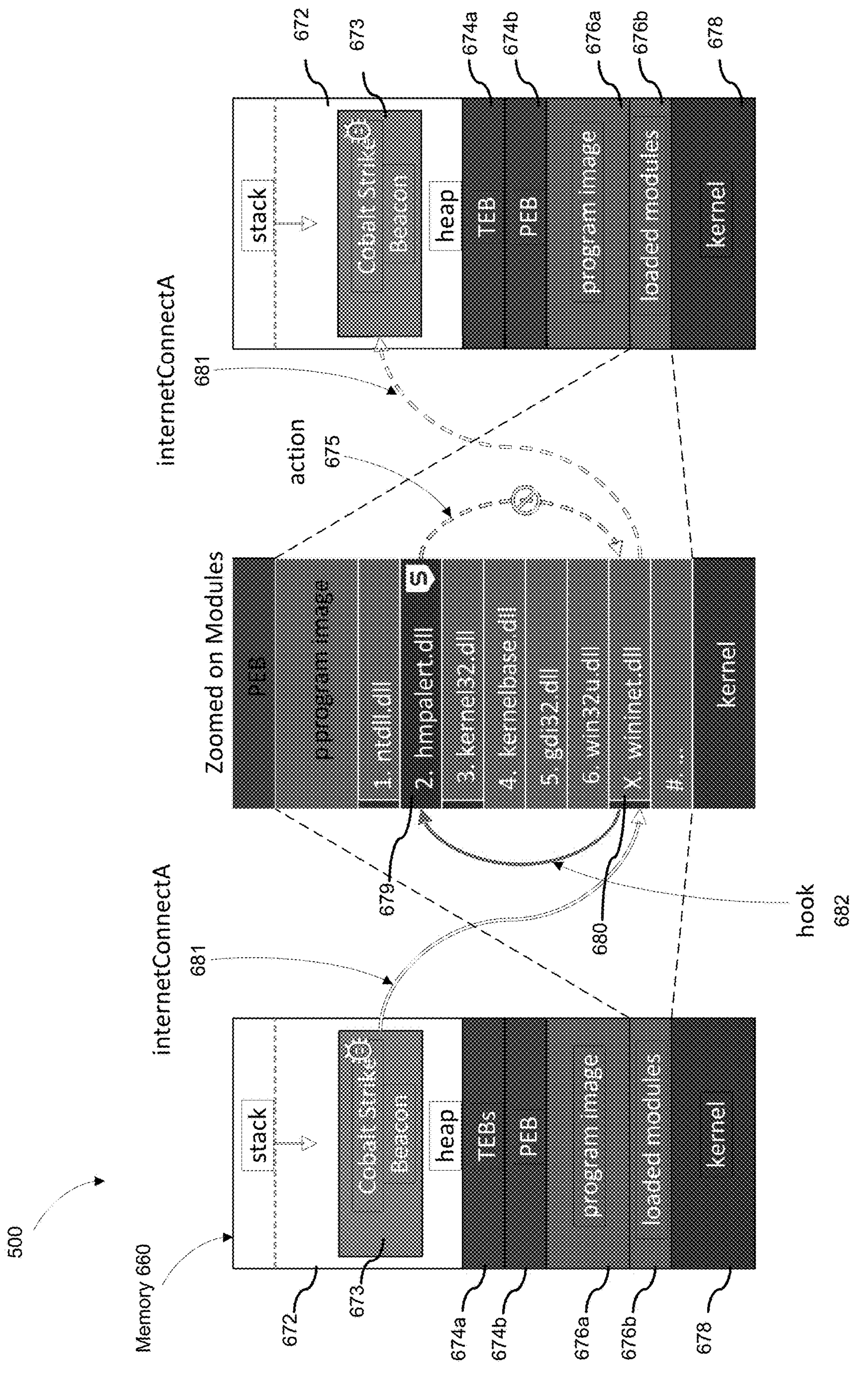
FIG. 6 is a schematic representation of using an MD system to detect and locate a malicious process, according to an embodiment.

FIG. 6 shows an example illustration of a process 600, implementing a method of locating a potentially malicious process or malware, using an MD system described herein, according to an embodiment. The process 600 includes locating malware via implementing an MD system (e.g., MD system 100) as described herein. The process 600 can be based on one or more methods described herein including method 400 and/or method 500. The illustration in FIG. 6 includes a memory 660 of a compute device where the disclosed process can be executed via a processor of that compute device. The process 600 includes intercepting a function call to a shared library to identify a source location associated with the function call. The example of FIG. 6 includes identifying a potentially malicious process, a Cobalt Strike beacon 673, associated with the function call.

As shown in FIG. 6 on the left most panel, the potentially malicious process, Cobalt Strike (CS) Beacon, or malware associated with the CS beacon 673, can reside in a memory 660 associated with a compute device (e.g., compute device 102-104 in FIG. 1 or compute device 302 in FIG. 3). In some implementations, the CS beacon 673 or malware associated with the CS beacon can reside in a heap memory 672 associated with the memory 660. The memory 660 can also include one or more thread environment blocks (TEBs) **674*a*, one or more process environment blocks (PEBs) 674*b*, program image portion 676*a*, loaded modules portion 676*b* (memory location for programs or modules or instructions that are loaded to be executed), and a kernel 678. FIG. 6B shows a magnified view of the loaded modules portion 676*b* from FIG. 6**A.

Often, upon infection of a vulnerable host, the CS beacon and the CS beacon malware associated with the CS beacon 673 can be in a dormant and obfuscated state for an unspecified period of time. The CS beacon can be challenging to locate and/or identify in a memory in the obfuscated state. The CS beacon however can transform into an activated and unobfuscated state when the CS beacon attempts to send a function call to a command control center (C2 center) to, for example, establish a communication channel with the C2 center. When the function call is sent by the CS beacon, therefore, the CS beacon and any malware (code or program) associated with the CS beacon is in the activated and unobfuscated state. The sending of the function call by the CS beacon 673 may be a brief event after which the CS beacon 673 and any malware associated with the CS beacon 673 can make a transformation to the inactivated and obfuscated state. The brief and unpredictable period of time that the CS beacon 673 is in an unobfuscated state, which is vulnerable to a memory scan, and the reasonable likelihood of having a memory scan in progress at that time and at that particular portion of the memory where the CS beacon 673 reside, make it challenging to identify a presence and a location of the CS beacon 673.

Initially, not shown in FIG. 6, the MD system monitors and receives an indication of a function call to the first program 680 or an indication that the first program 680 is loaded into a first memory for example the loaded modules **676*b*. When the first program 680 is loaded into the loaded modules 676*b*** at a first time also referred to as a load time, the MD system inspects and manipulates the first program

680 to insert a function hook 682 into the first program 680. The function hook includes jump instructions to cause a processor associated with the compute device that is executing the first program to jump to a second program 679 (e.g., hmpalert.dll). The second program 679 includes custom instructions to perform desired analyses to detect, locate and/or identify potentially malicious processes via a focused memory scan as described herein.

As shown in FIGS. 6, when the CS beacon 673 is activated the CS beacon 673 transforms into the activated and unobfuscated state. In the activated and unobfuscated state, the CS beacon 673 initiates a function call 671, to a first program 680. In the example in FIG. 6, the function call 671 is internetConnectA to the shared library wininet.dll to open an internet connection. In the process 600 illustrated in FIG. 6, the second program 679 includes custom code with custom instructions to perform custom operations as described herein. As shown in this example, the second program 679 is hmpalert.dll, which includes code and/or instructions to receive information associated with the function call 681, for example, parameters associated with the function call 681, and analyzing the information to generate an indication of source location associated with the origin of the function call 681, which in the example of FIGS. 6A-6C is a CS beacon 672. The instructions in the second program 679 can include instructions to initiate a scan of a range of memory addresses. The range of memory addresses is configured to encompass the source location indicated by the analyses. In some implementations, the second program 679 can include identifying potential malware, here the CS beacon malware 673, and scanning the malware for a match based on one more signatures of known malware.

In some implementations, the second program 679 can include instructions to return an identification or classification of the malware 673 located in the memory 660 based on which the MD system implementing the process 600 can generate a recommendation or an action for remedial measures. In some instances, as shown in FIG. 6, the MD system can identify the malware as CS beacon 673 via instructions in the second program 679, and based on the identification instruct the processor (e.g., processor 210 of MD analysis device 201 and/or processor 310 of compute device 302) to perform an action 676 to block transfer of execution back to the first program 680 as initiated by the function call 681. This action 676, blocking the return or jump back to the hooked function therefore blocks the performance of the identified action, which in the example in FIG. 6, is attempting to initiate an internet connection to establish a communication channel with a C2 center. In some instances, the second program 679 may further include instructions to generate an alert or a message indicating the actions performed as a report.

In some other instances, a second program 679 may receive indications that show that no malware was located or the code that was located may be a potential malware but the MD system did not have positive identification of the located code as a malicious artifact. In these example instances, the second program 679 may generate an alert indicating the potential threat. In some instances, the second program 679 may allow the jump back to the first program 680 to continue the execution of the first program 680 while closely monitoring the network communications associated with the function call 681. In some instances, the second program 679 may instruct a quarantine of one or more portions of the compute device (e.g., an application, a memory portion, a user, etc.) associated with the function call 681

In some instances, where no malicious process or malware is found, the second program 679 may allow the jump back to the first program 680 to continue the execution of the first program 680. That is, when the MD system determines an absence of a potentially malicious process stored in the one or more memories within the range of memory addresses, during the pausing of the execution of the first program or shared library 680, the second program 679 can permit, based on the determination of the absence of a potentially malicious process, a further execution of the shared library 680.

Figure 7:
FIG. 7 shows an example illustration of a remedial report generated based on detecting, locating, and/or identifying malware or a malicious process, by an MD system, according to an embodiment.

FIG. 7 is an example of an alert message 790, generated by an MD system described herein, according to an embodiment. The alert message 790 can be generated as part of a remedial measure following an identification of potential malware or a malicious process at a source location identified using the malware locating methods described herein. The alert message can identify the remedial measure performed, the malware detected (CS beacon), characteristics of the malware, actions performed as remedial measures to protect resources (e.g., termination of function call originating from the malware beacon), and recommendations (e.g., to check for malware and/or software updates). The message can include any suitable information associated with the identification of the potential malware including code snippets, instructions, signatures used, time stamps, platform, application used, memory addresses involved, and/or the like.

As shown in FIG. 7, the alert message can indicate the action performed 791 (e.g., "Attack Intercepted") and can identify characteristics of the action performed such as, for example, name of the process and/or the remedial measure taken (e.g., "beacon_stageless_APC_x64.exe" and "has been terminated"). The message 790 can also recommend a human user to perform one or more checks and/or reviews of the device, hardware, and/or software associated with the malicious process (e.g., recommend checking for malware and/or software updates). The message 790, in some implementations, can include a first portion identifying properties or parameters associated with the identification or detection of the malicious process. For example, as shown in FIG. 7, the message 790 can include the first portion 792 listing a timestamp associated with detection of the malicious process, a platform associated with the processor and/or memory related to the detection of the malicious process, and/or other details such as a process ID associated with an operating system, an identification of the malicious application or process, and other related descriptions. The message 790 can further include a second portion 793 that includes details associated with the identified malicious process. For example, as shown in FIG. 7, the second portion 793 can include communication parameters associated with the detected malicious process (e.g., communication parameters used by a beacon to make contact with a command-and-control (C2) server, the address of the C2 server with which the malicious process was attempting to connect, the user agent used to initiate communication with the C2 server (e.g., a string that identifies the browser that was used for the network communication), application parameters associated with communication to the C2 server, the process in which the malware is intended to be injected (e.g.,: www.cobaltstrike.com/blog/cobalt-strikes-process-injection-the-details-cobalt-strike/ or boschko.ca/cobalt-strike-process-injection/), and a name of the 'named pipe' (e.g., Cobalt Strike can use both named and unnamed pipes to exchange data between the beacon and its sacrificial processes, a malicious process that is a first process that spawns itself and injects into a second process different from the first process to initiate a beacon such that terminating the first process does not terminate the beacon. The alert message 790 can include any suitable detail associated with how the malicious process 793 injects itself into another process, and/or any suitable detail associated with the injection process. The alert message 790 can include a third portion 794 that identifies a stack trace or a location in memory that the process was executing at the time of interception of the attack or communication.

While examples discussed herein include identified actions that are a function call to initiate a network connection, in other implementations, the identified action can be any suitable action that may be performed or executed by a processor based on instructions stored in a memory. For example, any function that has a reasonable likelihood to be called can be used as a first program and the MD system can be configured to monitor and intercept a function call to that first program. For example, if there is a greater than average chance that a malware may call a function LoadLibraryA( ) from kernel 32, the MD system can place a hook on that function such that a function call to that function may be intercepted to perform the analyses described herein to locate an origin of the function call and thereby identify a source location of the malware.

While example malware that is located and/or identified by an MD system can be in an obfuscated state when inactive, the methods and systems described herein can be implemented to locate and/or identify malware that is not in an obfuscated state but is challenging to locate due to the amount of resources and/or computational power required to run exhaustive memory scans. The methods and systems described herein help identify focused smaller portions of a memory to scan, via a focused scan, to locate potential malware, thereby making the process of searching and locating a potential malware process resource and/or energy efficient. Moreover, due to the scan being configured to be a focused scan of a range of memory addresses that is limited, a more thorough method of scanning (e.g., signature-based method of scanning) can be implemented to scan for the potential malware. Such a method may not be possible when scanning over larger ranges of memory addresses.

While embodiments disclosed herein include malware or malicious process identified to be a malware beacon such as the Cobalt Strike (CS) beacon, other example malicious processes that include malware beacons that can be detected include Metasploit and/or Sliver. One example function call intercepted is disclosed (e.g., in FIG. 5) to be interConnectA to a first program wininet.dll. Other examples of function calls include function call InternetOpenA( ) to program wininet.dll, function call DnsQuery_A( ) to program dnsapi.dll, and/or function call LoadLibraryA( ) to kernel32.dll (which is not a network function related program).

While various embodiments have been described above, it should be understood that they have been presented by way of example only, and not limitation. Where methods and/or schematics described above indicate certain events and/or flow patterns occurring in certain order, the ordering of certain events and/or flow patterns can be modified. While the embodiments have been particularly shown and described, it will be understood that various changes in form and details can be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth. The use of any and all examples, or exemplary language (“e.g.,” “such as,” “including,” or the like) provided herein, is intended merely to better illuminate the embodiments, and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:

one or more memories; and one or more processors operatively coupled to the one or more memories, the one or more processors configured to:

based on loading a shared library into the one or more memories, insert a function hook into the shared library, the function hook configured to cause the one or more processors to pause execution of the shared library while executing a predetermined function;

identify a function call to the shared library;

execute, based on the function call, the predetermined function and, based on the execution of the predetermined function, scan a range of memory addresses located in the one or more memories, the range of memory addresses being determined based on the function call to the shared library;

determine, based on the scan of the range of memory addresses, a presence or absence of a potentially malicious process stored in the one or more memories;

locate a potentially malicious process stored in the one or more memories at a location within the range of memory addresses, during a pausing of the execution of the shared library; and positively identify the potentially malicious process as a malware beacon.

2. The apparatus of claim 1, wherein the one or more processors are further configured to:

analyze, based on the predetermined function, a set of parameters associated with the function call to the shared library; and identify the range of memory addresses based on the analysis of the set of parameters.

3. The apparatus of claim 2, wherein the one or more processors are further configured to:

determine, based on the set of parameters, a source location in the one or more memories associated with an origin of the function call, the range of memory addresses defined to encompass the source location in the one or more memories associated with the origin of the function call to the shared library.

4. The apparatus of claim 1, wherein the scan of the range of memory addresses includes performing a signature analysis to locate potentially malicious processes that have a signature of a known malicious process, the potentially malicious processes being stored in the one or more memories at a location within the range of memory addresses.

5. The apparatus of claim 1, wherein:

the potentially malicious process is in an unobfuscated and exposed state stored in the one or more memories and at the location within the range of memory addresses during the function call being sent to the shared library, and the potentially malicious process is in an obfuscated state of being stored in the one or more memories and at the location within the range of memory addresses at a time period when no function call is sent to the shared library by the potentially malicious process.

6. The apparatus of claim 1, wherein the potentially malicious process is a Cobalt Strike beacon.

7. The apparatus of claim 1, wherein the shared library is "wininet.dll" and the function call to the shared library is "internetConnectA".

8. The apparatus of claim 1, wherein the one or more processors are further configured to:

determine an absence of a potentially malicious process stored in the one or more memories within the range of memory addresses, during the pausing of the execution of the shared library; and permit, based on the determination of the absence of a potentially malicious process, further execution of the shared library.

9. The apparatus of claim 1, wherein the one or more processors are further configured to:

locate a potentially malicious process stored in the one or more memories at a location within the range of memory addresses, during the pausing of the execution of the shared library;

identify a malicious classification of the potentially malicious process;

block further execution of the shared library; and manipulate files, processes, or artifacts associated with the potentially malicious process based on the malicious classification of the potentially malicious process.

10. The apparatus of claim 1, wherein the function call is attempting to establish a network connection.

11. The apparatus of claim 1, wherein the shared library is at least one of an application programming interface (API) or a dynamic link library (DLL).

12. A non-transitory processor-readable medium storing code representing instructions to be executed by one or more processors, the instructions comprising code to cause the one or more processors to:

manipulate a shared library to insert a function hook into the shared library based on loading the shared library into a memory, the function hook configured to enable the one or more processors to pause execution of the shared library while executing a predetermined function;

identify a function call being sent to the shared library, the function call being associated with a network communication;

execute the predetermined function, during the pause of the execution of the shared library, to identify a source location in one or more memories associated with an origin of the function call;

identify a range of memory addresses in the memory, the range of memory addresses designed to include the source location in the memory associated with the origin of the function call;

scan the range of memory addresses in the memory;

determine a presence or absence of a potentially malicious process stored in the memory; and block the network communication based on a determination of a presence of the potentially malicious process stored in the memory.

13. The non-transitory processor-readable medium of claim 12, wherein the code to cause the one or more processors to determine a presence or absence of a potentially malicious process stored in the memory includes code to cause the one or more processors to:

locate a potentially malicious process stored within the range of memory addresses; and identify the potentially malicious process as a beacon to a command-and-control server associated with a malicious operator.

14. The non-transitory processor-readable medium of claim 13, wherein the function call is "internetConnectA" and the beacon is a Cobalt Strike beacon.

15. The non-transitory processor-readable medium of claim 13, wherein the shared library is "wininet.dll" and the beacon is a Cobalt Strike beacon.

16. The non-transitory processor-readable medium of claim 12, wherein the code to cause the one or more processors to determine a presence or absence of a potentially malicious process stored in the memory includes code to cause the one or more processors to:

compare code located within the range of memory addresses with each signature from a set of signatures, each signature from the set of signatures being associated with a known malicious process;

identify, in response to the comparing, a set of code stored within the range of memory addresses as potentially malicious based on a match between the set of code and at least one signature from the set of signatures, the set of code being stored in an unobfuscated state during the pause of the execution of the shared library; and perform a remedial action, based on the identifying the set of code as potentially malicious.

17. The non-transitory processor-readable medium of claim 12, further comprising code to cause the one or more processors to:

locate a potentially malicious process stored within the range of memory addresses;

identify a maliciousness classification of the potentially malicious process; and generate an alert based on the identifying the maliciousness classification of the potentially malicious process.

18. A method, comprising:

inserting a function hook in a shared library, based on loading the shared library into a memory, the function hook configured to cause a pause in execution of the shared library and a jump to a predetermined function;

receiving an indication of a function call to the shared library, the function call configured to initiate a network connection;

executing the predetermined function, during the pause in the execution of the shared library, to identify a source location in one or more memories, the source location being associated with an origin of the function call to the shared library;

scanning a range of memory addresses associated with the source location in the one or more memories; and identifying, based on the scanning, a potentially malicious process within the range of memory addresses.

19. The method of claim 18, wherein the executing the predetermined function includes:

analyzing parameters associated with the function call; and inspecting a code associated with the function call to the shared library, the code being stored at the source location in the one or more memories.

20. The method of claim 19, wherein the inspecting the code includes comparing the code with a set of signatures, each signature from the set of signatures being associated with a known malware.

* * * * *